United States Patent [19]

Kim et al.

[11] 4,131,453
[45] Dec. 26, 1978

[54] PYROMETALLURGICAL BRASS PRODUCTION

[75] Inventors: Jonathan J. Kim, Chelmsford; Thomas A. Loose, Billerica; Chih-Chung Wang, Lexington, all of Mass.

[73] Assignee: Kennecott Copper Corporation, New York, N.Y.

[21] Appl. No.: 825,641

[22] Filed: Aug. 18, 1977

[51] Int. Cl.$^2$ ............................................. C21B 3/04
[52] U.S. Cl. .................................... 75/72; 75/10 R; 75/14; 75/25; 75/86; 75/157.5
[58] Field of Search .................. 75/21, 24, 25, 72-77, 75/86, 135, 157.5, 14

[56] References Cited

U.S. PATENT DOCUMENTS

| | | | |
|---|---|---|---|
| 2,776,881 | 1/1957 | Thomsen | 75/86 |
| 3,094,411 | 6/1963 | Trifflekman | 75/157.5 |
| 3,909,243 | 9/1975 | McKewan | 75/72 |

Primary Examiner—M. J. Andrews
Attorney, Agent, or Firm—John L. Sniado; Anthony M. Lorusso

[57] ABSTRACT

Waste materials containing significant quantities of zinc oxide are mixed with carbon and a sufficient amount of copper to set the overall Zn/Cu weight ratio to a selected value below 0.66. The mixture is loaded into the top of a shaft furnace having a lower region which is heated. Hot gas rising from lower regions of the shaft furnace preheats the mixture as it descends. Rising zinc vapor is prevented from escaping the furnace because it condenses in the relatively cool preheated mixture descending down the furnace. As the mixture descends, it enters a brass production zone where zinc vapor alloys with the copper in the mixture. Further descent brings the mixture to a zinc reduction zone where the temperature is above 950° C and where ZnO is reduced by carbon or carbon monoxide to produce a zinc vapor which rises coutercurrently to the charge. Molten brass and some slag is removed from a brass reservoir which forms in the bottom of the furnace.

12 Claims, 5 Drawing Figures

PYROMETALLURGICAL BRASS PRODUCTION

BACKGROUND OF THE INVENTION

This invention relates to a pyrometallurgical process for producing brass from materials such as dusts from brass factory furnace emissions which contain significant quantities of oxidized zinc. Another common material containing oxidized zinc which may be used to produce brass in accordance with the invention is metallic fines from reclamation plants.

Brass producing plants annually generate millions of pounds of furnace emission dust, ball mill fines, and other byproducts containing zinc and copper values. The environmental restrictions recently imposed on brass mills increases the availability of these materials, and therefore, it is expected that increased quantities will be available in the future. Accordingly, there is a growing necessity for a process by which such byproducts can be economically treated to recover metallic values at the brass factory.

Typically, furnace emission dusts comprise a mixture of oxides of copper and zinc, containing trace amounts of lead and iron, with the zinc oxide making up about 70% to 90% of the total dust weight. The weight ratio of copper and zinc oxides in ball mill fines from reclamation plants is dependant on the source of this material.

In U.S. Pat. Ser. No. 3,909,243 to McKewan, a process is disclosed for recovering both brass and zinc from metallurgical residues by a carbon floatation method. Brass, zinc, and zinc oxide containing materials are charged into a furnace which is heated up to about 1250° C. After the brass has melted and sunk to the bottom, carbon is added to reduce the zinc oxide to zinc metal, which is produced in vapor form. The zinc vapor is then removed and condensed, and molten slag and brass are periodically drawn off the furnace. While this technique shows promise for recovering metal values from brass factory waste materials, it requires the collection and condensation of zinc vapor. Because the equipment to handle zinc vapor is elaborate and expensive, this aspect of the McKewan process represents a significant disadvantage if a recovery procedure inexpensive enough to be set up at the site of the brass mill is desired.

SUMMARY OF THE INVENTION

The present invention is based on the observation that copper metal and brasses having a zinc content generally below about 40% by weight can act as a "getter" for zinc vapor. In the practice of the invention, the foregoing "getter" together with a zinc vapor condensation zone in a shaft furnace are utilized to treat brass mill waste products to economically produce brass at atmospheric pressure without emitting zinc vapor from the furnace. Since no zinc vapor escapes the furnace in which the process is practiced, the expense of handling this material is obviated. Furthermore, the procedure results in brass of acceptable purity which contains zinc in weight percentages of any desired value up to a maximum of about 40%.

In the process of the invention, cyclone dust or other materials containing significant quantities of oxidized zinc are mixed with copper containing materials such as scrap copper to provide a mixture having an overall zinc to copper weight ratio of a selected value below 0.66. This material is then mixed with carbon, preferably with about a 5% stoichiometric excess of that required to reduce the oxidized metal values contained in the material, and the mixture is added to the top section of a loaded shaft furnace. There, the mixture is preheated by hot vapors rising from lower regions of the furnace to a temperature between about 300° to 1000° C. The mixture is then allowed to descend into the furnace to a higher temperature brass producing zone. In the brass producing zone, copper metal or a copper-zinc alloy acts as a "getter" for the zinc vapor, resulting in the production of brass. The mixture including the brass then descends to a still higher temperature zinc reduction zone which is heated, typically by an induction coil, to maintain the temperature in the zone above about 950° C. In this zone, zinc oxide in the mix is reduced by carbon or carbon monoxide. The zinc vapor and carbon oxides produced rise countercurrently to the charge. Zinc vapor which does not become alloyed with the copper or brass in the brass producing zone is condensed near the top of the furnace within the relatively cool preheated mixture and is thereby incorporated into the charge. Liquid brass and/or slag is intermittently or continuously removed from a brass reservoir which forms at the bottom of the furnace. It should be noted that any source of indirect heating such as arc heating or resistance heating can be employed in place of the induction coil to heat the zinc reduction zone.

In preferred embodiment, the preheating of the charge at the top of the furnace is effected by absorbing heat from off-gases exiting the furnace and by the condensation of zinc vapor. The carbon monoxide content of the off-gases, if any, also reduces oxidized copper which may be present in the charge. Copper oxide reduction may also be effected by carbon. The zinc to copper weight ratio in the charge is preferably below about 0.66. The brass produced preferably has a zinc content of about 20% and 40% by weight and the temperature in the zinc reduction zone is preferably about 1100° C., although any temperatures in excess of 950° C. is operable to reduce zinc oxide to zinc.

Accordingly, it is an object of the invention to provide an economical process for recovering zinc and copper values from a wide variety of waste materials containing significant quantities of these values in oxidized form.

Another object of the invention is to produce brass of acceptable purity from zinc oxide containing byproduct materials.

Still another object of the invention is to provide a method of producing brass of a given desired zinc content up to about 40% from zinc containing emission dust, ball mill fines, brass mill dross, and the like.

Yet another object of the invention is to recover zinc values as molten brass by the reduction of zinc oxide with carbon at atmospheric pressure while reducing the problems associated with the treatment of the resulting zinc vapor.

Another object of the invention is to increase metal recovery at the brass mill.

DESCRIPTION OF THE PREFERRED EMBODIMENT

In the process of the invention, materials containing significant quantities of oxidized zinc, e.g., waste materials, are mixed with carbon and a sufficient amount of copper and/or low zinc content brass to provide a mixture having an overall zinc-copper weight ratio of a selected value below about 0.66. Exemplary compositions of brass mill by-products which may be used are set forth below.

TABLE I

Typical Compositions of Brass Dusts

| Dust Material | Composition (weight %) | | | |
|---|---|---|---|---|
| | Cu | Zn | Pb | Fe |
| Cyclone Dust-Furnace Emission | 4.8 | 66.3 | 0.0006 | 0.12 |
| Baghouse Dust-Furnace Emissions | 0.3 | 73.7 | 0.01 | 0.70 |
| Metallics-Ball Mill | 70.7 29.2 | 0.01 | 0.05 | |
| Classifier-Ball Mill | 16.0 | 61.0 | — | 0.18 |
| Cyclone-Ball Mill | 5.0 | 69.2 | — | 0.16 |
| Baghouse-Ball Mill | 5.1 | 65.4 | — | 0.19 |
| Brass-Melter Dross I | 38.7 | 47.1 | 1.5 | 0.80 |
| Brass-Melter Dross II | 39.3 | 47.8 | 0.011 | 0.05 |
| Casting Shop Dust | 5.76 | 64.1 | — | — |

As can be appreciated from the foregoing table, the starting materials comprise major amounts of zinc and copper and trace amounts of lead and iron. Typically, the remaining weight of the dusts or ball mill fines is made up by oxygen combined with the metal values. While the process of the invention will be described with reference to mill byproducts of the type set forth above as a starting material, it is obvious that other sources of oxidized zinc, e.g., dead-roasted concentrates, could be used in the process of the invention if desired.

Figure 1:
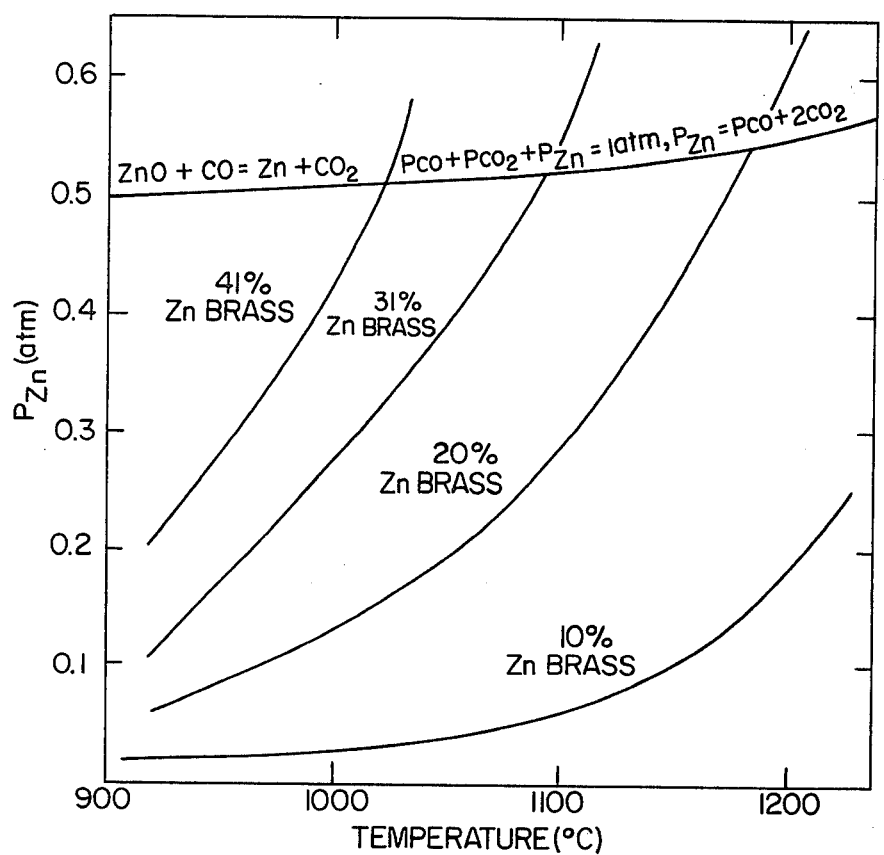
FIG. 1 is a graph of the partial pressure of zinc vapor, in atmospheres, versus temperature for brasses containing 10, 20, 31 and 41 weight percent zinc, respectively, and for the reduction of zinc oxide with carbon monoxide.

In accordance with the invention, the weight percentage of zinc and copper in the starting material must be set such that a brass containing zinc in amounts up to the set percentage will act as an effective getter for zinc vapor at the temperature at which the alloy is produced. To illustrate the relationship between the zinc content of the brass produced and the temperature at which the reduction of zinc oxide by carbon monoxide is effected, reference should be made to FIG. 1, wherein the partial pressure of zinc vapor over various brasses and over pure zinc produced by the reduction of zinc oxide with carbon monoxide at atmospheric pressure is illustrated. In order for a brass to act as a getter for zinc vapor, it is necessary that the vapor pressure of zinc vapor above the molten brass alloy be less than the partial pressure of the zinc vapor produced by carbon reduction of zinc oxide. Accordingly, as illustrated by FIG. 1, at 1000° C., brasses containing 40 weight percent zinc may be produced, whereas, at 1100° C., the vapor pressure of brass containing more than about 31% zinc will be slightly greater than the partial pressure of the zinc produced by reduction, and brass containing 30 weight percent zinc may be produced.

Thus, the temperature of the reduction and zinc content of the brass product are interrelated, and the zinc to copper weight ratio of the charge introduced at the top of the furnace must be set such that the foregoing thermodynamics are satisfied.

In general, it is theoretically possible to produce a brass having up to about 50% zinc content. However, the preferred zinc content of the resulting brass is between about 20 and 40%, and the reduction temperature should be between 950° C. and 1200° C., depending on the zinc to copper ratio selected and also on the ability of the furnace to operate with favorable kinetics.

At this point it should be noted that the way in which the zinc to copper weight ratio of the charge is attained is not particularly significant. Thus, cyclone or baghouse dust containing large amounts of zinc oxide and only trace amounts of copper may be mixed with brass melter dross or similar byproduct materials containing high percentages of copper to fix the ratio. Alternatively, or in addition, scrap copper may be added.

The presently preferred method of preparing the materials for introduction into the furnace consists of pelletizing brass dust (fines, cyclone dust, baghouse dust, etc.) with a carbonaceous reductant and a binding flux such as sodium disilicate. The furnace is then charged with several alternating layers of pellets and copper scrap or chip.

Figure 2:
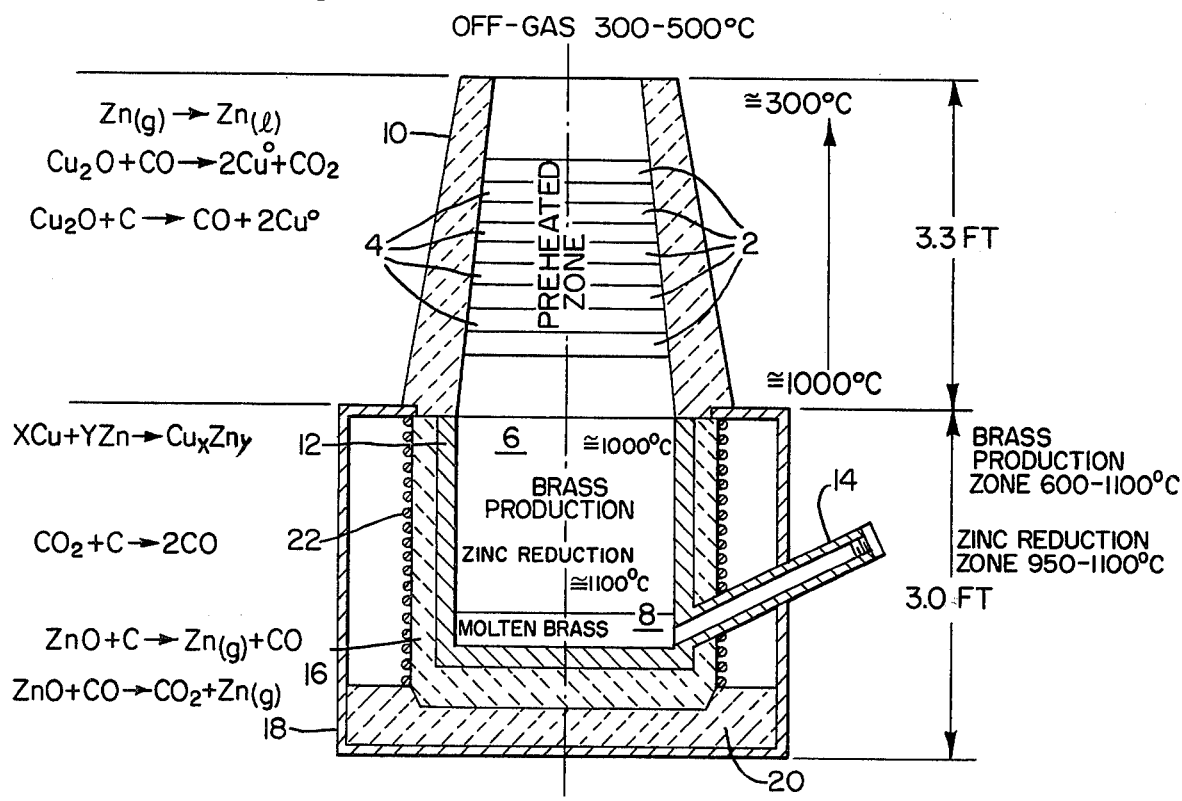
FIG. 2 is a cross-section of a shaft furnace useful in the practice of the process of the invention.

Referring to FIG. 2, a shaft furnace of the type in which the process of the invention may be practiced is shown. The furnace comprises a shaft 10 of castable alumina refractory material which gradually widens from top to bottom to facilitate movement of the furnace charge. The base of shaft 10 fits about the mouth of a machined carbon crucible 12 fitted with an overflow tube 14 and seated within an alumina refractory material 16. A case 18 having a base of refractory material 20 houses the crucible. An induction coil 22 surrounds the refractory material 16 and supplies heat to the interior of the crucible 12.

In operation, alternate layers of pelletized zinc oxide dust 2 containing carbon, and scrap copper 4 are heated to about 300 to 1000° C. by condensing zinc vapor and/or cooling effluent gases rising from lower regions of the furnace. Copper oxides are effectively reduced by carbon or carbon monoxide. As the charge descends, copper metal and small amounts of zinc metal which may be contained in the charge, melt in a higher temperature brass producing zone 6. As the charge descends further, zinc oxide starts to be reduced in a still higher temperature (e.g. 950° C. or more) zinc reduction zone 8. Carbon oxides, produced as a byproduct, and zinc vapor ascend countercurrently to the charge. As the zinc vapor ascends, it alloys with copper or brass in brass producing zone 6 wherein the alloy acts as a zinc getter. Any zinc vapor which is not absorbed in zone 6 ascends to a point near the top of the furnace where it condenses, heats the charge, and decends down the shaft 10.

The brass which forms in the brass production zone settles to the bottom of the crucible to form a molten brass reservoir. The temperature of the molten brass reservoir is identical to that of the lower region of the zinc reduction zone, that is, the highest temperature of the crucible. Although the drawing shows the brass production zone located above the zinc reduction zone, brass actually forms inside the preheated zone at temperatures as low as 600° C., and continues to form through the zinc reduction zone. The temperature of the brass producing zone is, therefore, between 600° C., and 1100° C., if the temperature of the molten brass reservoir is set at 1100° C. The zinc reduction zone starts at the top of the crucible and extends down to the molten brass reservoir.

For the start up of the furnace operation, it is necessary to first pack the shaft furnace with solid start-up materials. Accordingly, the cold, empty shaft furnace of the type shown in FIG. 2 is initially charged with a heel of copper and/or brass which is loaded to the top of crucible 12. The shaft is then loaded to the top with alternating layers of carbon-zinc oxide pellets and copper or brass scrap (or with a mixture of zinc oxide, carbon, and sized scrap). This initial charge should have a Zn/Cu weight ratio of 1.0. If an initial Zn/Cu charge ratio of one can not be attained it is preferrable to set the ratio at a value which is slightly in excess of one rather than utilizing a charge in which the Zn/Cu weight ratio is less than one. Low to intermediate frequency induction power is then turned on and the power is increased to the optimum level as soon as possible for the equipment, furnace crucible, and refractories involved. During the start-up period (typically 2-6 hours) the charge ratio is gradually decreased to a final selected Zn/Cu weight ratio of 0.66 or less.

In a layered charge operation, alternate feeds of sized scrap and carbon-zinc oxide pellets are fed automatically, triggered for example by a predetermined amount of charge settling in the shaft. In a mixed charge operation, a feed mixture comprising zinc oxide, carbon, and copper and/or high copper content brass scrap may be fed nearly continuously.

As soon as the molten brass metal in the furnace reaches a certain level, it siphons out an upwardly angled overflow tube 14 into either a holding furnace for alloy upgrading or into molds for subsequent sale or captive use. Once a day, the furnace (shaft and charge intact) is tilted 10°-20° to pour out any accumulated slag through the overflow tube 14.

The Zn/Cu weight ratio of the furnace charge is determined by the desired zinc content of brass in production, except during the initial start up period, in which case a Zn/Cu ratio of one is used. To produce the preferred brass containing 30-40% zinc by weight, a Zn/Cu weight ratio 0.66 to 0.43 is employed and the temperature of the zinc reduction zone is maintained between 950° to 1100° C.

Figure 3:
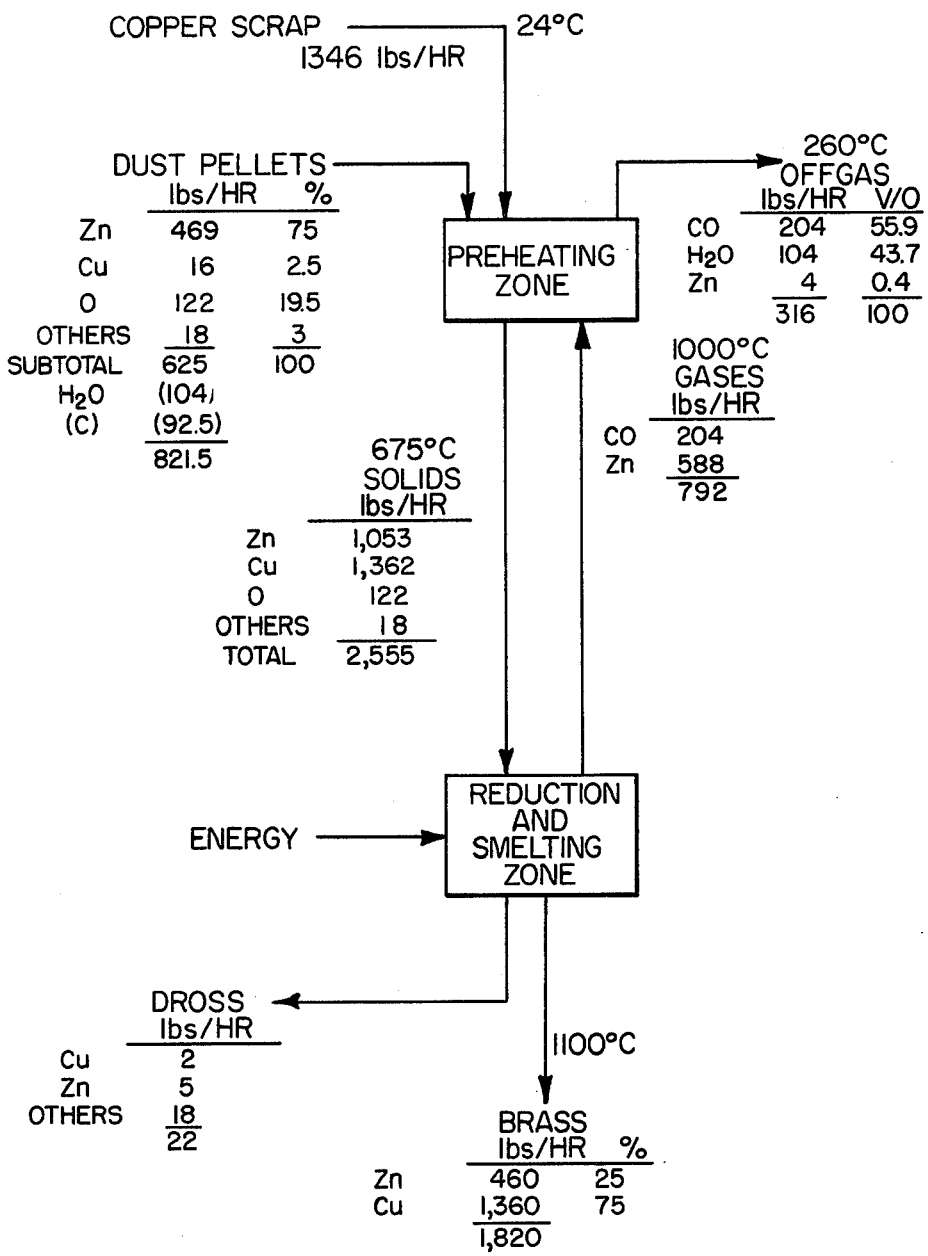
FIG. 3 is a schematic diagram of the process of the invention projecting mass and heat balance in a relatively shallow shaft furnace.

FIG. 3 is a schematic illustration of mass and heat balance in a shaft furnace of the type described above having a preheating shaft diameter about 1.8 ft. at the top and 2.3 ft. at the bottom and a shaft height of 3.3 ft., and a reduction and smelting zone 2.3 ft. in diamter and 3 ft. high. Room temperature copper scrap plus zinc oxide - carbon containing pellets of the composition set forth are introduced into the shaft where they are preheated by rising gases to about 500° C.

It has been estimated that about 544,530 BTU/hr. will be absorbed by the charge. The preheated solid material, after descent, is heated through conduction and radiation in the cylindrical graphite crucible. The heat duty of the reduction and smelting zone necessary to produce molten brass at the rate of 1,820 lbs. per hour has been calculated to be about 1,977,900 BTU/hr. (586 Kw).

The invention will be further understood from the following nonlimiting example.

A high frequency induction furnace was modified to accomodate process requirements by attaching a silica shaft in a manner similar to that shown in FIG. 2. The furnace was electrically heated by a water-cooled induction coil with a maximum power output of 30 Kw. Pellets used as feed material consisted of brass dust from various sources, coke (85% carbon), and sodium disilicate as a binding flux. To obtain a reasonably strong pellet after drying, it is necessary that approximately five percent of the weight of the pellets comprise binding flux. The pellets were completely dried at 150° C. in a laboratory oven and their density was determined to be between about 2.2 and 2.8 g/ml. The copper used in the experiments comprised pancake shaped bundles of 20 gauge copper wire, each of which weighed approximately 0.65 lbs. The furnace was initally charged with four alternating layers of pellets and copper bundles, each layer weighing approximately 3-4 pounds. The packing density of the furnace was approximately 89 lbs/ft.$^3$ and the total furnace burden was 9-12 pounds.

The experiments were started by applying approximately 10Kw. The power level was adjusted to a desired level when the furnace burden was observed to descend one inch below the shaft top. The power input was closely maintained at a constant level during each experimental period. The rate of descent of the furnace burden was measured before a new charge was added to the furnace. Temperatures, both at the shaft top and molten base, were measured by Chromel-Alumel thermocouples. At the end of each experimental run, the charge level was allowed to descend five to six inches below the shaft top. Then, after operation for at least three hours, the furnace power was cut off and molten brass was cast as ingots. Unreacted solid material remaining in the furnace shaft was carefully classified as crust, indurated pellet, brass prill, and partially alloyed copper. These were separately weighed and samples of each were analyzed for copper, zinc and lead as well as $SiO_2$. A summary of all experimental runs is shown in Table II set forth below.

TABLE II

| | Summary of Experimental Runs | | |
|---|---|---|---|
| Run No. | Adjusted Charge Ratio of Zn:Cu | Coke Addition Excess(%)* | Source of Dust |
| BD-16 | 25/75 = .33 | 20 | Cyclone |
| BD-17 | 23/77 = .30 | 50 | Cyclone |
| BD-18 | 30/70 = .43 | 20 | Baghouse |
| BD-19 | 30/70 = .43 | 20 | Baghouse |
| BD-20 | 50/50 = 1.00 | 20 | Cyclone |
| BD-21 | 50/50 = 1.00 | 20 | Cyclone |
| BD-22 | 50/50 = 1.00 | −35 | Baghouse Emission |
| BD-23 | 27/73 = .37 | 20 | Cyclone Emission |
| BD-24 | 27/73 = .37 | 20 | Cyclone |
| BD-25 | 30/70 = .43 | 0 | Cyclone |
| BD-26 | 40/60 = .66 | 50 | Cyclone |

*Excess of stoichiometric quantity for the reaction, $ZnO+C=Zn+CO$

As can be seen from the foregoing table, the ratio of zinc to copper in the charges of the respective experiments was varied from 1 to 0.30. Dust used as raw materials, as set forth above, were the cyclone product, the baghouse product, and the emission cyclone dust. The chemical composition of these materials is set forth in Table III below. At this point it should be noted that it is preferred to utilize a Zn/Cu charge ratio of 0.66 or less once the system has reached steady state. Although runs BD-20 - BD-22 appear to show acceptable results, the results after reaching steady state would not be acceptable because utilizing a charge containing 50% zinc results in a build-up of zinc residue. Since it is preferred to produce an alloy containing no more than 40% zinc, the charge at steady state should not have more than 40% zinc i.e., a Zn/Cu ratio of 0.66 or less. At steady state, a charge having a Zn/Cu ratio of 0.66 should produce an alloy containing 40% zinc and 60% copper. Because of the large amounts of copper used in start-up and the short run time, steady state was not reached in these examples.

TABLE III

Chemical Composition of Dusts Used as Raw Material

|    | Cyclone Dust (Wt %) | Baghouse Dust (Wt %) | Emission Cyclone Dust (Wt %) |
|----|---------------------|----------------------|------------------------------|
| Zn | 52.9                | 47.1                 | 66.3                         |
| Cu | 10.6                | 20.0                 | 4.8                          |
| Pb | 1.28                | 1.30                 | 0.0006                       |
| Fe | 0.56                | 0.51                 | 0.12                         |
| Si | 3.67                | 2.58                 | —                            |
| Al | 2.6                 | 4.7                  | —                            |

The remaining weight of the above materials was essentially made up of oxygen combined with the metal values.

The composition of the brass ingots produced in all experimental runs was determined to be in the range of 10–20 weight percent zinc, the remainder being copper. A summary of the composition of the ingots and brass prills is set forth in Table IV below.

TABLE IV

Summary of Composition of Brass Products Composition (weight percent)

| Run No. | Ingot Cu | Ingot Zn | Prill Cu | Prill Zn |
|---------|----------|----------|----------|----------|
| BD 16   | 86.2     | 12.9     | —        | —        |
| BD 17   | 83.7     | 15.2     | 78.5     | 19.0     |
| BD 18   | 79.7     | 18.9     | 71.6     | 24.6     |
| BD 19   | 81.1     | 17.1     | 73.5     | 24.7     |
| BD 20   | 75.5     | 19.5     | 76.0     | 23.1     |
| BD 21   | 79.7     | 17.0     | 73.0     | 24.5     |
| BD 22   | 80.0     | 16.4     | 76.9     | 20.0     |
| BD 23   | 78.0     | 19.8     | 66.9     | 32.0     |
| BD 24   | 80.2     | 18.2     | 79.4     | 20.5     |
| BD 25   | 83.8     | 14.7     | 73.4     | 24.2     |
| BD 26   | 87.7     | 10.0     | 67.5     | 30.1     |
|         | Average zinc = 16.3 | | Average zinc = 24.3 | |

The copper wire bundles which were alternately layered with pellets were observed to be almost fused by becoming brass and a number of brass prills were observed at the lower part of the smelting zone, above the molten brass reservoir. Thus, the composition of the prills formed at the level of the molten brass reservoir is indicative of the ingot composition which can be produced in a steady-state, since the composition of the prills had approached a steady-state whereas the molten brass in the reservoir had not.

The smelting rate was observed to increase linearly as power input was increased. However, the molten brass temperature was determined to be 1100–1180° C. regardless of power input.

In all runs, it was apparent that the zinc content of the ingots was not reaching a steady-state condition. A longer time will accordingly be necessary to produce a brass of the desired higher zinc content. The zinc content of both brass ingot and prill is independent of power input (or specific smelting rate).

Figure 4:
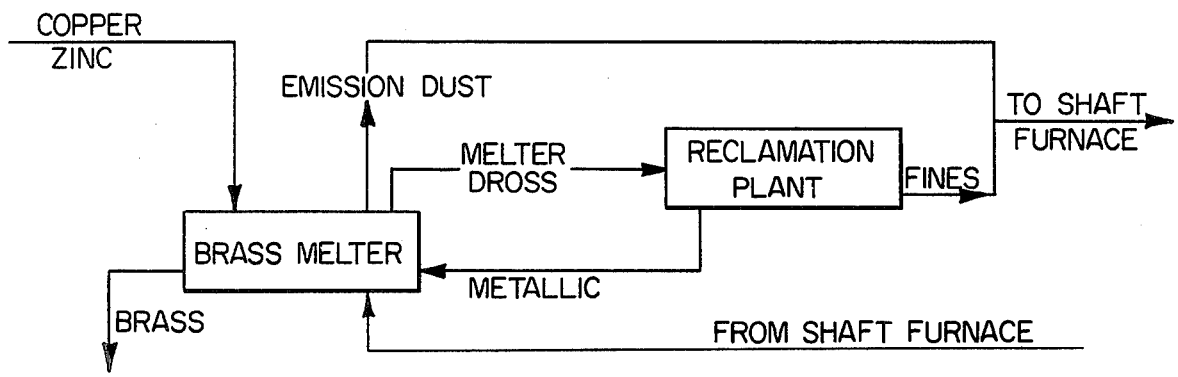
FIG. 4 is a flow sheet of a brass mill showing the sources of emission dusts and fines which can be treated in accordance with the present invention; and, FIG. 5 is a flow sheet of a brass mill in accordance with the present invention in which a shaft furnace replaces the reclamation plant of FIG. 4.

The foregoing description has been generally directed to a process in which emission dust from a brass melter and/or fines from a ball mill dross reclamation plant are processed to produce brass. A flow sheet of this type of process is shown in FIG. 4. Thus, emission dust from the brass melter and fines from the benefactor, as shown in FIG. 4, can be treated in a shaft furnace in accordance with the present invention in order to improve the overall efficiency of the brass mill. The present invention can be used to great advantage in conjunction with existing brass mill plants which utilize melters and a dross reclamation plant.

Figure 5:
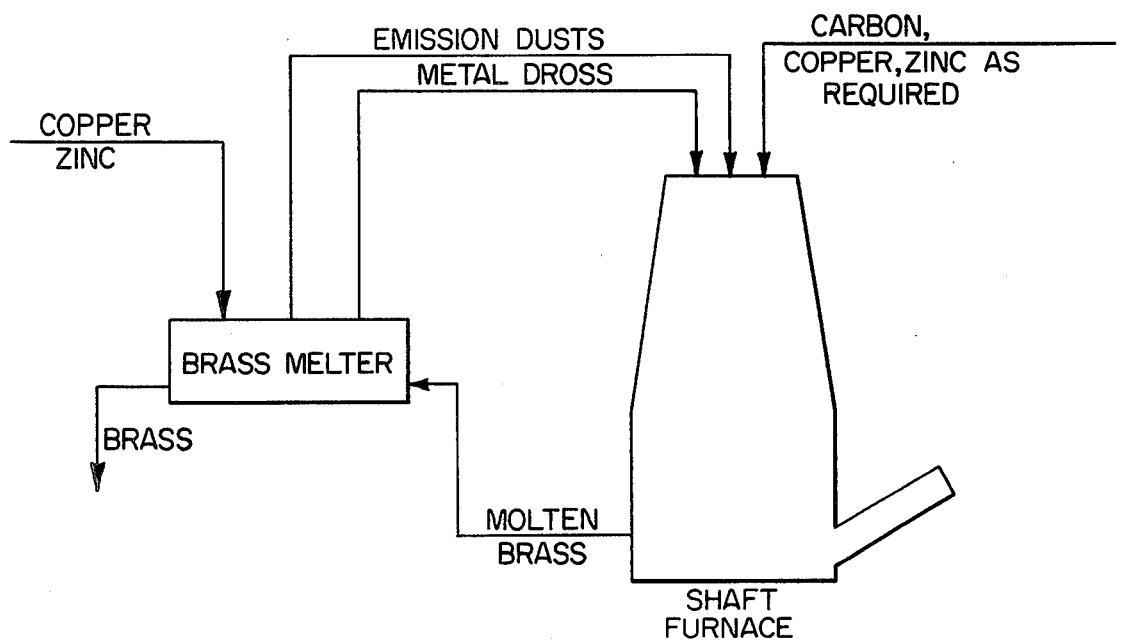

However, the dross reclamation plant shown in FIG. 4 can be replaced by the shaft furnace of the present invention as is schematically illustrated in FIG. 5. In this arrangement, melter dross is fed from the melter directly to the shaft furnace together with the emission dust. Since the shaft furnace replaces the reclamation plant, there are no ball mill fines to treat. Of course, carbon and other materials would be added to the shaft furnace in order to maintain the material balances necessary in practicing the present invention.

Yet another manner in which the invention can be practiced is to eliminate the melter and reclamation plant completely. In this embodiment, copper, brass chip, and zinc are fed into a shaft furnace such as the one shown in FIG. 2 along with the carbonaceous material. The operating parameters for this embodiment are the same as those set forth above.

At this point it should be noted that if a new brass mill is to be constructed, the most economical procedure is to simply construct a shaft furnace of the type shown in FIG. 2 and operate it in accordance with the present invention. However, for existing plants of the type shown in FIG. 4, the most economical procedure is to treat the emission dust and fines from the melters and reclamation plant in accordance with the present invention.

From the foregoing, it should be clear that the broad concept of the present invention involves producing brass from zinc oxide, copper, and carbon. Key features of the invention include flowing ascending zinc vapor countercurrently to descending cooler copper or copper containing material with which it alloys. Also important is the feature of setting the Zn/Cu weight ratio of the decending feed to a selected value below 0.66 and to heat the decending zinc oxide, copper and carbon to a temperature within the range of 500°–1000° C. before it enters a zinc oxide reduction zone. These materials are indirectly heated by countercurrently ascending gases (CO + zinc vapor).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A pyrometallurgical process for producing brass from a material containing a significant quantity of oxidized zinc, said process comprising the steps of:
   1. adding carbon to said material and a sufficient amount of copper to provide a mixture having an overall Zn/Cu weight ratio of a selected value of 0.66 or less;
   2. adding the mixture to the top of a shaft furnace;

3. preheating the mixture in the shaft of said furnace to a temperature of 300° C. or more;
4. allowing the mixture to descend in said furnace to a brass producing zone through which zinc vapor rises to cause the vapor to alloy with copper to form brass which settles and forms a molten brass reservoir;
5. allowing the mixture to descend in said furnace to a zinc reduction zone wherein the temperature is above 950° C. and where ZnO in the mixture is reduced to produce zinc vapor which rises to the brass zone;
6. condensing zinc vapor rising through the brass producing zone in the shaft of said furnace to reduce the need for treating zinc vapor outside the furnace; and,
7. removing liquid brass from the molten brass reservoir.

2. The process as set forth in claim 1 wherein said material contains oxidized copper and said copper is reduced by carbon or carbon monoxide to copper metal during said process.

3. The process as set forth in claim 1 wherein said preheating step is effected by effluent gases rising from lower regions of said furnace and by the condensation of zinc vapor.

4. The process as set forth in claim 1 wherein the total amount of carbon added is an excess of the stoichiometric quantity necessary to reduce the oxides in said material.

5. The process as set forth in claim 1 wherein the zinc reduced in step 5 is reduced by carbon monoxide which is produced from the carbon in said mixture.

6. The process as set forth in claim 1 wherein the brass produced has a Zn content between 20% and 40%.

7. The process as set forth in claim 1 wherein said material is pelletized with carbon, and scrap copper is added to said furnace together with said material to form said mixture.

8. The process as set forth in claim 1 wherein the zinc reduction zone is heated by indirect heating.

9. A process for producing a brass alloy from oxidized zinc, said process comprising the steps of:
1. adding carbon and a sufficient amount of a copper containing material to the oxidized zinc to fix the overall Zn/Cu weight ratio to a selected value below 0.66;
2. adding the mixture of step 1 to the top of a shaft furnace;
3. preheating the mixture produced in step 1 in the shaft of said furnace to a temperature within the range of 300°-700° C.
4. allowing the mixture of step 2 to descend in the furnace to a brass producing zone through which zinc vapor rises to cause the vapor and the copper to alloy to form brass which settles to form a molten brass reservoir;
5. allowing the mixture to descend to a zinc reduction zone wherein the temperature is above 1100° C. to produce zinc vapor, and carbon oxides, the zinc vapor being allowed to rise countercurrent to said mixture to said brass producing zone;
6. condensing zinc vapor rising through the brass producing zone in the shaft of said furnace to reduce the need for treating zinc vapor outside the furnace; and,
7. removing liquid brass from the molten brass reservoir.

10. The process as set forth in claim 9 wherein the copper containing material contains oxidized copper and carbon monoxide is produced in said furnace and wherein said carbon monoxide is allowed to ascend to reduce the oxidized copper.

11. The process as set forth in claim 9 wherein the copper containing material comprises copper metal scrap.

12. The process as set forth in claim 9 wherein said preheating step is effected by the condensation of zinc vapor and heat exchange with carbon oxides.

* * * * *